US009007611B2

(12) United States Patent
Asai

(10) Patent No.: US 9,007,611 B2
(45) Date of Patent: Apr. 14, 2015

(54) NON-TRANSITORY COMPUTER-READABLE RECORDING MEDIUM AND INFORMATION PROCESSING DEVICE HAVING A SHARING FUNCTION OF PROCESSING DATA

(71) Applicant: Brother Kogyo Kabushiki Kaisha, Nagoya-shi, Aichi-ken (JP)

(72) Inventor: Norihiko Asai, Tajimi (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/337,965

(22) Filed: Jul. 22, 2014

(65) Prior Publication Data

US 2015/0029530 A1 Jan. 29, 2015

(30) Foreign Application Priority Data

Jul. 23, 2013 (JP) ................................. 2013-152938

(51) Int. Cl.
*G06F 3/12* (2006.01)
*H04N 1/00* (2006.01)

(52) U.S. Cl.
CPC ....... *H04N 1/00954* (2013.01); *H04N 1/00307* (2013.01); *H04N 1/00413* (2013.01); *H04N 1/00411* (2013.01); *H04N 1/00941* (2013.01); *H04N 2201/0075* (2013.01)

(58) Field of Classification Search
CPC .......... H04N 1/00954; H04N 1/00411; H04N 1/00413; H04N 1/00307; H04N 1/00941; H04N 2201/0075
USPC ................................ 358/1.13, 1.15, 505, 474
See application file for complete search history.

(56) References Cited

U.S. PATENT DOCUMENTS

| 7,949,950 | B2 * | 5/2011 | Van Hoof ....................... 715/251 |
|---|---|---|---|
| 2010/0067035 | A1 * | 3/2010 | Kawakubo et al. .......... 358/1.13 |
| 2012/0054461 | A1 * | 3/2012 | Asai ............................... 711/170 |
| 2012/0166997 | A1 * | 6/2012 | Cho et al. ....................... 715/778 |
| 2012/0243043 | A1 * | 9/2012 | Asai ............................... 358/1.15 |
| 2012/0243048 | A1 * | 9/2012 | Asai ............................... 358/1.16 |
| 2012/0311131 | A1 * | 12/2012 | Arrasvuori .................... 709/224 |
| 2013/0063619 | A1 * | 3/2013 | Asai ........................... 348/222.1 |

FOREIGN PATENT DOCUMENTS

| JP | 2005-049928 A | 2/2005 |
|---|---|---|
| JP | 2012-248051 A | 12/2012 |

* cited by examiner

*Primary Examiner* — Benny Q Tieu
*Assistant Examiner* — Quyen V Ngo
(74) *Attorney, Agent, or Firm* — Merchant & Gould PC

(57) ABSTRACT

An information processing device may be configured to have data, which is outputted by a first application, be processed by a second application, which is selected from among a plurality of applications. The information processing device may send execution instruction information that instructs an execution of the scan process to the image processing device. The information processing device may acquire the one or more image data from the image processing device. The information processing device may acquiring property information indicating an execution property of the scan process. The information processing device may extract one or more supporting applications supporting the execution property. The information processing device may display identification information for identifying the one or more supporting applications on the display. The information processing device may receive an input indicating a selection of the second application and process the one or more image data by the selected second application.

16 Claims, 13 Drawing Sheets

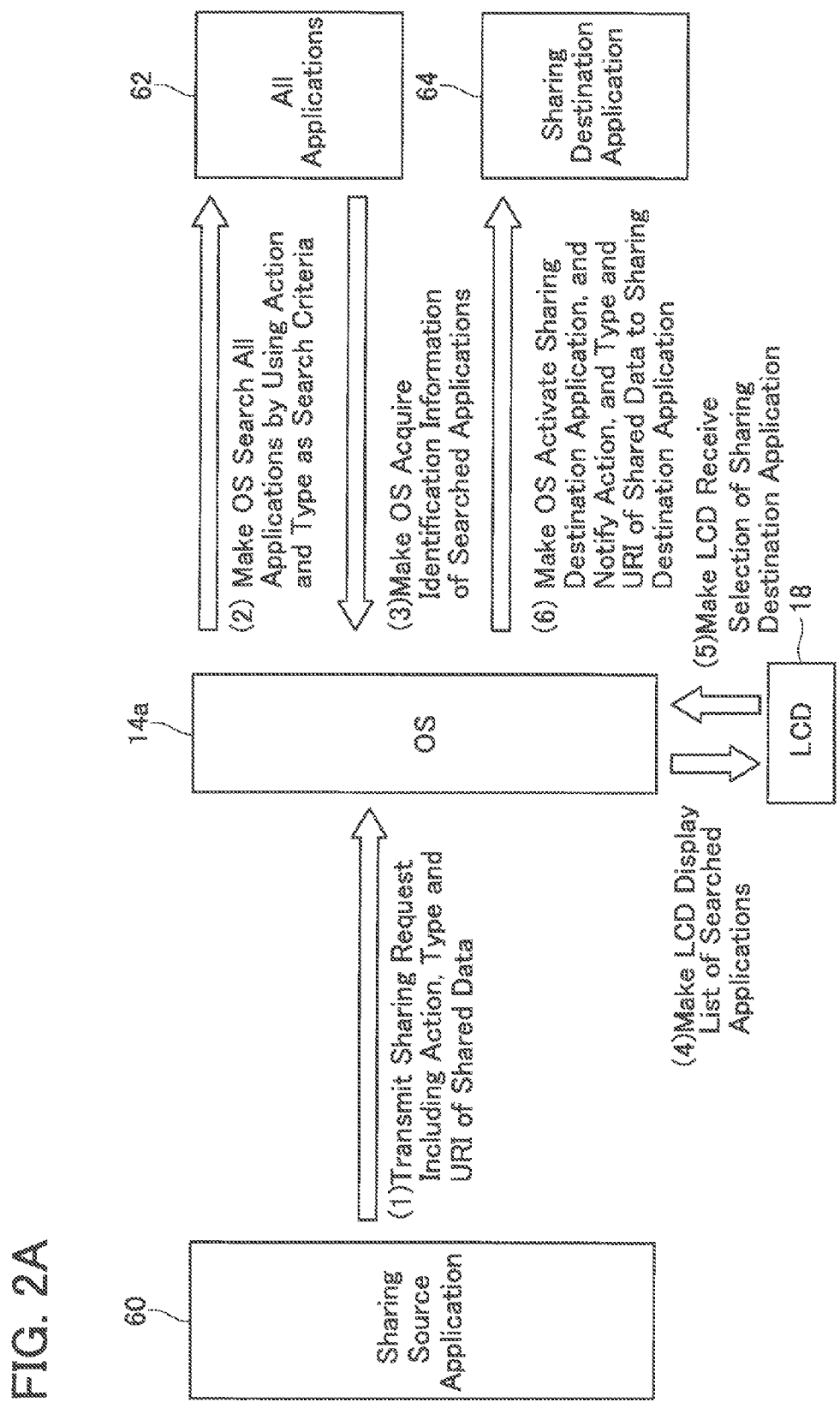

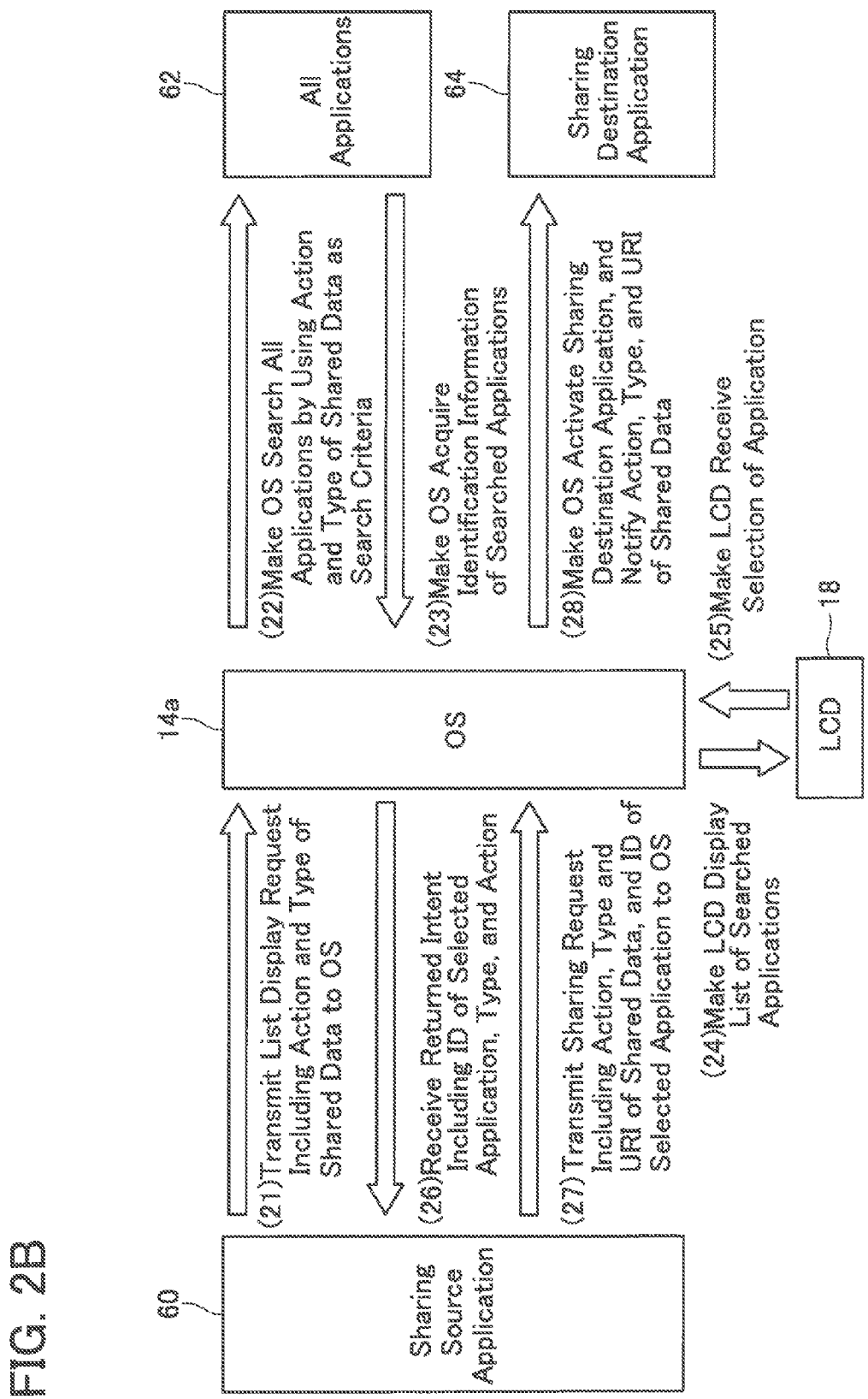

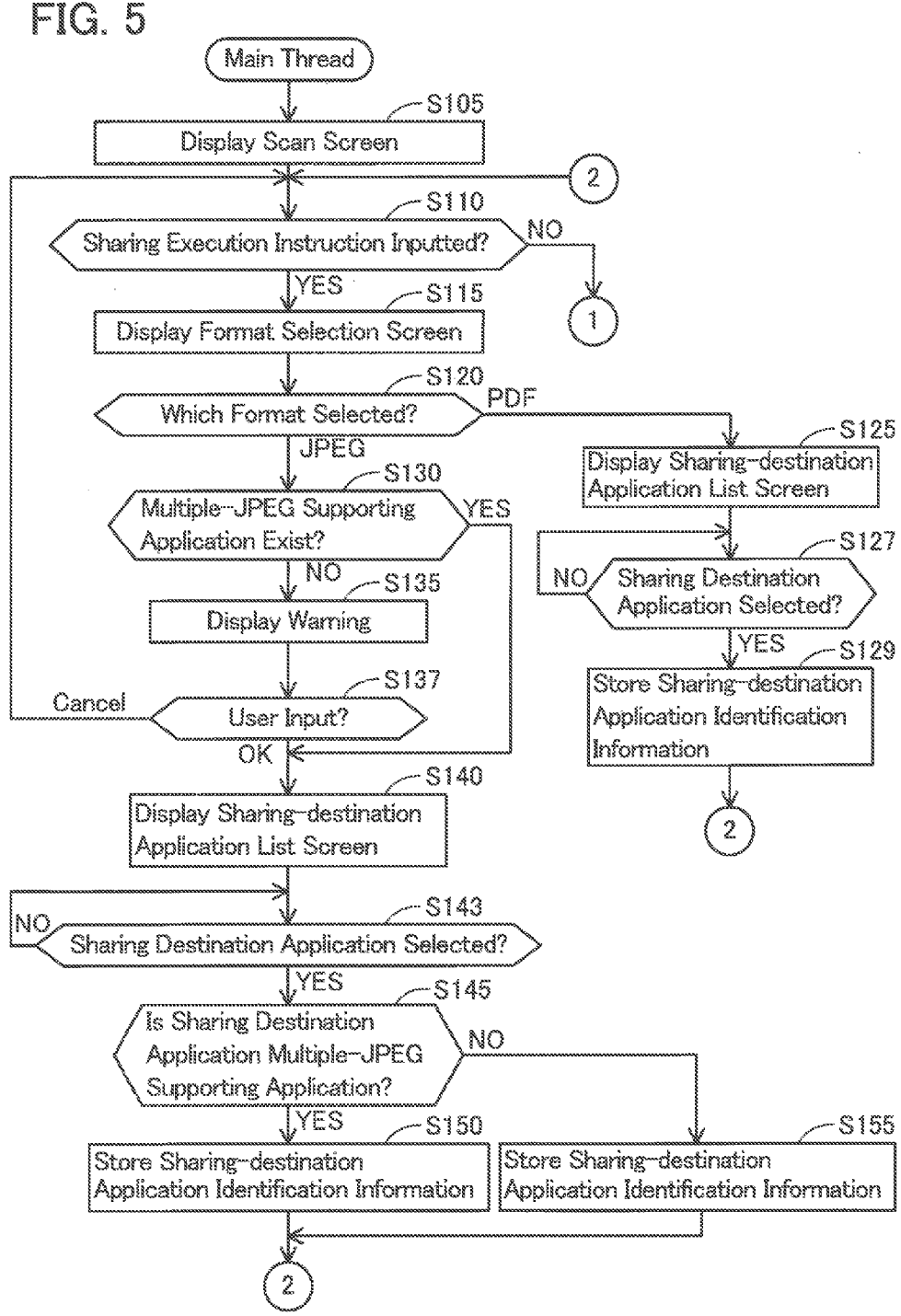

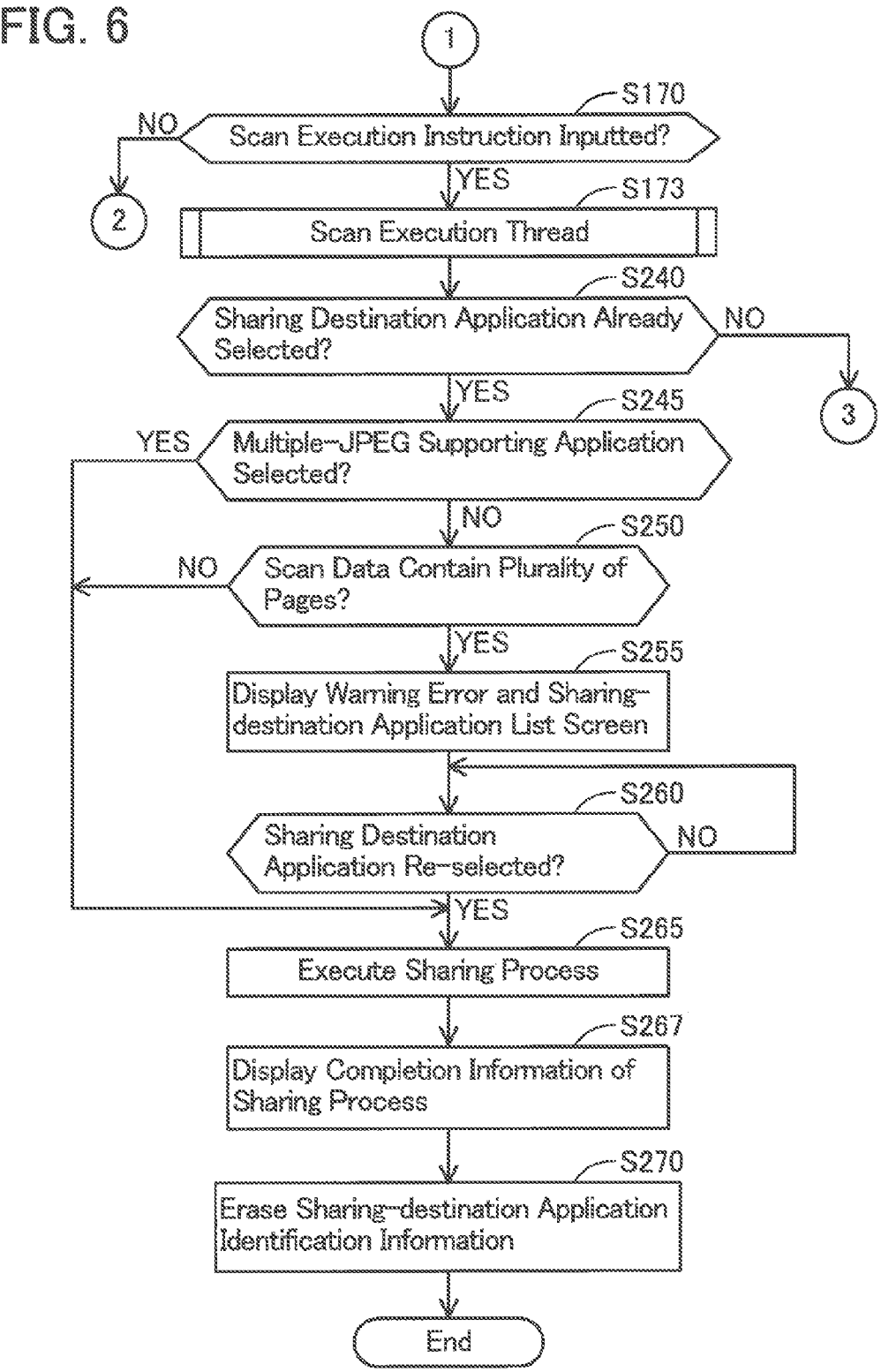

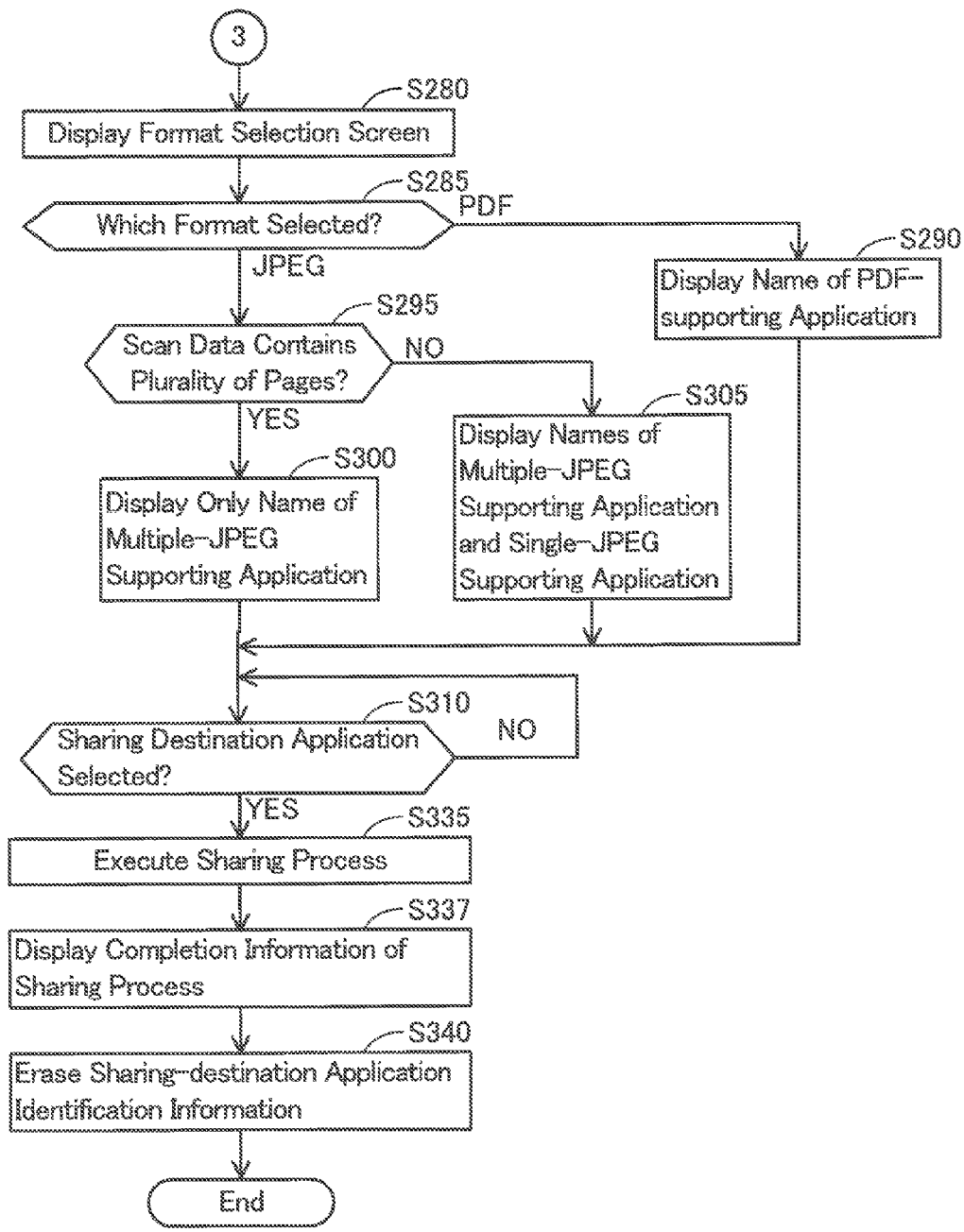

NON-TRANSITORY COMPUTER-READABLE RECORDING MEDIUM AND INFORMATION PROCESSING DEVICE HAVING A SHARING FUNCTION OF PROCESSING DATA

CROSS-REFERENCE TO RELATED APPLICATIONS

This application claims priority to Japanese Patent Application No. 2013-152938, filed on Jul. 23, 2013, the contents of which are hereby incorporated by reference into the present application.

TECHNICAL FIELD

A technology disclosed in this specification relates, for example, to an information processing program that allows various kinds of data to be shared between a plurality of applications.

DESCRIPTION OF RELATED ART

In portable terminals, there are portable terminals having a function called 'sharing function'. The sharing function is a function of providing data processed in one application to another application, and making the another application process the data. For example, in a case where image data is obtained by imaging of a digital camera built in a portable terminal, and a JPEG file is generated from the image data by a camera application, for example, the JPEG file can be provided to an e-mail application by the sharing function such that the JPEG file can be transmitted as an attachment of an e-mail. As described above, according to the sharing function, it is possible to make a plurality of applications cooperate with one another such that a wide variety of processes can be performed in the portable terminal. Further, the application that is capable of processing JPEG files is not limited to the e-mail application. There may be a plurality of kinds of applications that is capable of processing JPEG files. For example, a technology for activating different JPEG applications according to folders including JPEG files stored therein is known.

SUMMARY

Applications supporting the sharing function are categorized into applications that are capable of handling a plurality of data and applications that are not capable of handling a plurality of data. Therefore, in a case where an application that is not capable of handling a plurality of data has been selected as a sharing-destination application to handle a plurality of data, it may become impossible to execute a sharing process, which does not lead to a high degree of usability.

In one aspect of the teachings disclosed herein, a non-transitory computer-readable recording medium which stores computer-readable instructions for an information processing device may be provided. The information processing device may be configured to have data, which is outputted by a first application that is a data output-source application, be processed by a second application, which is selected from among a plurality of applications as a data output-destination application. The information processing device may comprise: a processor; a display; and a communication interface for communicating with an image processing device configured capable of executing a scan process of scanning one or more documents and creating one or more image data. The computer-readable instructions, when executed by the processor, may cause the information processing device to perform sending execution instruction information that instructs an execution of the scan process to the image processing device through the communication interface. The computer-readable instructions may cause the information processing device to perform acquiring the one or more image data from the image processing device through the communication interface. The computer-readable instructions may cause the information processing device to perform acquiring property information indicating an execution property of the scan process before acquiring all of the one or more image data from the image processing device through the communication interface. The computer-readable instructions may cause the information processing device to perform extracting one or more supporting applications from among the plurality of applications. The one or more supporting applications may support the execution property indicated by the acquired property information. The computer-readable instructions may cause the information processing device to perform displaying identification information for identifying the one or more supporting applications on the display. The computer-readable instructions may cause the information processing device to perform receiving an input indicating a selection of the second application from among the one or more supporting applications of which identification information is displayed. The computer-readable instructions may cause the information processing device to perform processing the one or more image data by the second application that had been selected.

In another aspect of the teachings disclosed herein, a non-transitory computer-readable recording medium which stores computer-readable instructions for an information processing device may be provided. The information processing device may be configured to have data, which is outputted by a first application that is a data output-source application, be processed by a second application, which is selected from among a plurality of applications as a data output-destination application. The information processing device may comprise: a processor; a display; and a communication interface for communicating with an image processing device configured capable of executing a scan process of scanning one or more documents and creating one or more image data. The computer-readable instructions, when executed by the processor, may cause the information processing device to perform displaying identification information for identifying the plurality of applications on the display. The computer-readable instructions may cause the information processing device to perform receiving an input indicating a first selection of the second application from among the plurality of applications of which identification information is displayed. The computer-readable instructions may cause the information processing device to perform sending execution instruction information to the image processing device through the communication interface after having received the input indicating the first selection. The execution instruction information may instruct an execution of the scan process. The computer-readable instructions may cause the information processing device to perform acquiring the one or more image data from the image processing device through the communication interface. The computer-readable instructions may cause the information processing device to perform acquiring property information indicating an execution property of the scan process before acquiring all of the one or more image data from the image processing device through the communication interface. In a case where the second application of the first selection does not support the execution property indicated by the acquired property information, the computer-readable instructions may further cause the information processing device to perform extracting one or more supporting applications supporting the execution property indicated by the acquired property information. The computer-readable instructions may further cause the information processing device to perform displaying identification information for identifying the one or more supporting applications on the display. The computer-readable instructions may further cause the information processing device to perform receiving an input indicating a second selection that re-selects the second application from among the one or more supporting applications of which identification information is displayed. The computer-readable instructions may further cause the information processing device to perform processing the one or more image data by the second application of the second selection.

BRIEF DESCRIPTION OF DRAWINGS

FIGS. 2A and 2B are views illustrating sharing functions;

FIG. 5 is a flow chart showing a main thread process;

FIG. 6 is a flow chart showing the main thread process;

FIG. 7 is a flow chart showing the main thread process;

EMBODIMENT

Figure 1:
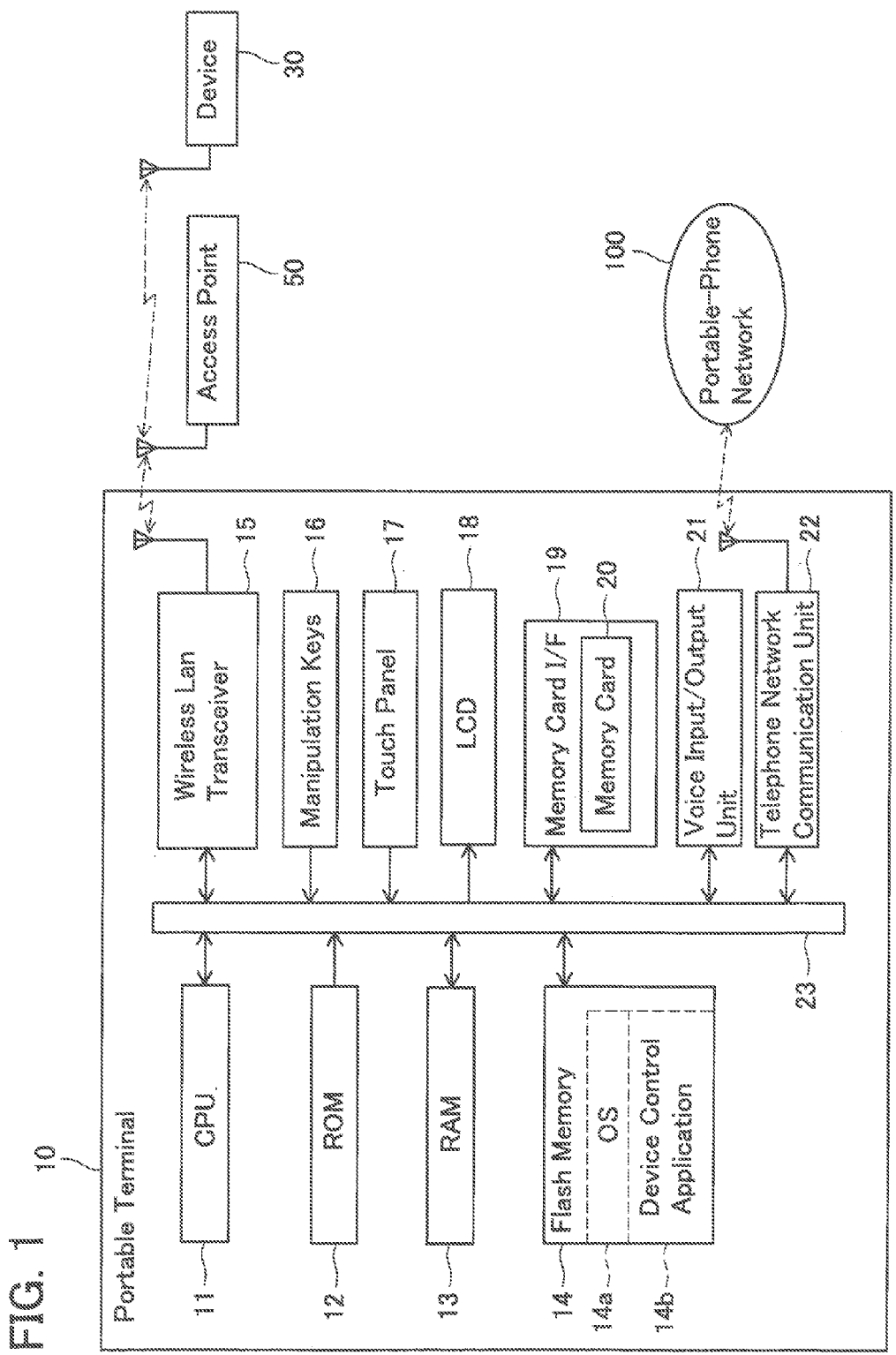
FIG. 1 is a block diagram illustrating an electrical configuration of a portable terminal having a device control application installed therein.

Hereinafter, embodiments will be described with reference to the accompanying drawings. FIG. 1 is a block diagram illustrating an electrical configuration of a portable terminal 10 having a device control application 14b (hereinafter, referred to as a present application 14b) installed therein, according to a first embodiment of the present embodiment.

The portable terminal 10 is a portable phone that enables a voice call with another device through a portable-phone network 100 or can use the Internet. Further, the portable terminal 10 performs wireless communication with the device 30 by an infrastructure mode through an access point 50. The portable terminal 10 includes a CPU 11, a ROM 12, a RAM 13, a flash memory 14, a wireless LAN transceiver 15, manipulation keys 16, a touch panel 17, a liquid crystal display 18 (hereinafter, referred to as an LCD 18), a memory card interface 19 (hereinafter, referred to as a memory card I/F 19), a voice input/output unit 21, and a telephone network communication unit 22. These components are connected to one another through bus lines 23.

The CPU 11 controls each of the units connected to the bus lines 23, in accordance with fixed values, programs, and the like stored in the ROM 12 or the like. The ROM 12 is a non-volatile memory which is rewritable, and the RAM 13 is a volatile memory which is not rewritable. The flash memory 14 is a non-volatile memory which is rewritable, and stores an operating system 14a (hereinafter, referred to as an OS 14a), the present application 14b, and a plurality of kinds of other applications (not shown). The CPU 11, the ROM 12, the flash memory 14, etc. may be a computer readable storage medium. The computer readable storage medium is a non-transitory medium, such as a ROM, RAM, flash memory, etc. An electrical signal carrying a program to be downloaded from a server, etc. on the Internet is not included in the non-transitory medium. The OS 14a is basic software for implementing the standard functions of the portable terminal 10, and is an Android (registered as a trademark) OS in the present embodiment. The device control application 14b is provided by a vendor of the device 30, and is installed in the portable terminal 10 by the user.

Hereinafter, the CPU 11 which executes a program such as an application, an operating system, or the like may be referred to simply as the name of the program. For example, a term 'application' may mean 'the CPU 11 that executes an application'. In the present specification, the description "the CPU 11 of the portable terminal 10 receives various types of information" includes the technical meaning "the CPU 11 of the portable terminal 10 acquires various types of information via the wireless LAN transceiver 15". Further, the description "the CPU 11 of the portable terminal 10 transmits various types of information" includes the technical meaning "the CPU 11 of the portable terminal 10 outputs various types of information via the wireless LAN transceiver 15".

Applications use the API of the OS 14a installed in the portable terminal 10 to implement a sharing function (intent function) of providing and receiving data between the applications. The present application 14b installed in the portable terminal 10 is for allowing a user to directly use the printing function and scanning function of a device 30 from the portable terminal 10, without passing through a personal computer or the like. Particularly, the present application 14b is configured to have a high degree of usability in a case of providing scan date, acquired from the device 30, to another application by the sharing function.

The wireless LAN transceiver 15 is a circuit for making a Wi-Fi (registered as a trademark) connection between the portable terminal 10 and another device by a wireless LAN based on the standards of IEEE 802.11b and 802.11g. The portable terminal 10 is wirelessly connected with the device 30 through the access point 50 by the wireless LAN transceiver 15.

The manipulation keys 16 are hard keys provided to the housing of the portable terminal 10, and are used for inputting option information or instructions to the portable terminal 10. The touch panel 17 is provided to overlap the LCD 18, and is used for inputting option information and instructions to the portable terminal 10. The LCD 18 displays various manipulation screens, and images based on selected data. The memory card I/F 19 is an interface for installing a non-volatile memory card 20, and controls writing or reading of data on the memory card 20. The memory card 20 may be an SD card (registered as a trademark). In the present embodiment, the present application 14b converts scan data received from the device 30 into a PDF format file (hereinafter, referred to as PDF data) or a JPEG format file (hereinafter, referred to as JPEG data), and stores the converted data in the memory card 20. The format of PDF data is a data structure that allows a single item of PDF data including multiple pages to be created. The format of JPEG data is a data structure that does not allow multiple pages to be included. The term "multiple pages" here means data including plural pages.

The voice input/output unit 21 is a unit which is for voice input and output and includes a microphone, a speaker, and so on, and the telephone network communication unit 22 is a circuit for performing communication through the portable-phone network 100. The portable-phone network 100 is a communication network based on international mobile tele-communication-2000 (referred to as IMT-2000), and enables use of a voice call through the portable terminal 10.

Each of the applications (including the present application 14b) installed in the portable terminal 10 calls the API of the OS 14a, and outputs data for each component of the portable terminal 10, such as the wireless LAN transceiver 15, the manipulation keys 16, the touch panel 17, the LCD 18, the memory card I/F 19, the voice input/output unit 21, and the telephone network communication unit 22, to the OS 14a. In other words, each application controls each component of the portable terminal 10 by calling the API of the OS 14a. Further, each application calls the API of the OS 14a, and acquires data output from each component of the portable terminal 10, and data representing a status of each component, from the OS 14a. That is, each application acquires data representing a status of each component of the portable terminal 10 (including a status of manipulation input to the portable terminal 10), from the OS 14a, by calling the API of the OS 14a. The OS 14a may notify the data which each component of the portable terminal 10 outputs, and the data representing the status of each component, to each application, regularly or whenever the status of each component changes. In other words, each application receives the notification from the OS 14a, thereby acquiring the data representing the status of each component of the portable terminal 10 (including the status of the manipulation input to the portable terminal 10) from the OS 14a.

The device 30 is a multi-function device having a printer function, a scanning function, a copy function, and the like, includes a wireless LAN transceiver (not shown) having the same configuration as that of the wireless LAN transceiver 15 of the portable terminal 10, and makes a Wi-Fi connection with the portable terminal 10 by wireless communication through the access point 50. Further, the device 30 is controlled by the present application 14b of the portable terminal 10, such that the device 30 prints images based on data received from the portable terminal 10, or reads a document to generate scan data and transmits the scan data to the portable terminal 10.

Here, a definition of the words "data" and "information" will be explained. In the present specification, "information" is used as a concept superordinate to "data". Consequently, "A data" may be rephrased as "A information". Further, "B data", which is duplicated or converted from "A data", is "A information" as long as it is used having a meaning equal to the "A data".

The sharing function that is implemented by using the API of the OS 14a of the portable terminal 10 will be described with reference to FIGS. 2A and 2B. The sharing function is a function of making a data output destination application process data which is output by a data output source application. Examples of the sharing function include an implicit sharing function and an explicit sharing function. FIG. 2A is a view illustrating an implicit sharing function, and shows a process flow in a case where a data output source application (hereinafter, referred to as a sharing source application 60) makes a request to the OS 14a to perform the implicit sharing function.

As shown in FIG. 2A, in the implicit sharing function, the sharing source application 60 calls the API of the OS 14a, and makes a request to the OS 14a to perform the sharing function (see (1) of FIG. 2A). This request includes the uniform resource identifier (URI) and type of data (hereinafter, referred to as shared data) to be processed in another application process by the sharing function, and an action. The URI is information representing the location of the shared data, and is composed of a file path in the present embodiment. The type is information which designates the format of the shared data, and the action is information which designates the kind of a process. The OS 14a searches all applications (hereinafter, referred to as all application 62) installed in the portable terminal 10 for candidates for a data output destination application (hereinafter, referred to as a sharing destination application 64), by using the type and the action notified from the sharing source application 60, as search criteria (see (2) of FIG. 2A).

Each application installed in the portable terminal 10 declares a type which designates a format which the corresponding application can process, and an action which designates the kind of an executable process, in advance. Therefore, the OS 14a searches all application 62 by using the type and the action notified from the sharing source application 60 as the search criteria. Then, OS 14a extracts applications which can process data having the format designated by the type notified from the sharing source application 60, and support the kind of the process designated by the action notified from the sharing source application 60, and acquires identification information of the extracted applications. The developer of each application can feely set the type and the action which the corresponding application declares. For this reason, each application may declare a process which the corresponding application cannot actually perform, as the action. Therefore, an application supporting the type of the process which is designated by the action notified from the sharing source application 60 means an application that declares the same action as the action notified from the sharing source application 60, and is not required to actually perform the corresponding process.

Next, the OS 14a makes the LCD 18 display a list of the searched applications, that is, the applications which are candidates for the sharing destination application 64 (see (4) of FIG. 2A). Then, if a user selects any one application as the sharing destination application 64 from the list (see (5) of FIG. 2A), the OS 14a activates the sharing destination application 64, sets a screen of the sharing destination application 64 in the foreground (referred to as "forefront"), and notifies the URI and type of the shared data, and the action notified from the sharing source application 60, to the sharing destination application 64 (see (6) of FIG. 2A).

As a result, the screen of the sharing destination application 64 selected by the user is displayed in the foreground, and the sharing destination application 64 accesses the shared data specified by the notified URI, and performs the process according to the value of the action. The sharing destination application 64 may perform various executable processes on the shared data. For example, the sharing destination application 64 may display the shared data, or transmit the shared data as an attachment of an e-mail, or edit the shared data.

FIG. 2B is a view illustrating the explicit sharing function, and shows a process flow in a case where the sharing source application 60 makes a request to the OS 14a to perform the explicit sharing function.

As shown in FIG. 2B, in the explicit sharing function, the sharing source application 60 calls the API of the OS 14a, and makes a request to the OS 14a to display a list of candidates for a sharing destination application 64 (see (21) of FIG. 2B). This request includes the type of shared data and an action. The OS 14a searches all application 62 installed in the portable terminal 10 for candidates for the sharing destination application 64, by using the type and action notified from the sharing source application 60, as the search criteria, (see (22) of FIG. 2B), and acquires the identification information of applications satisfying the search criteria (see (23) of FIG. 2B).

Next, the OS 14a makes the LCD 18 display a list of the candidates for the sharing destination application 64 found by the searching (see (24) of FIG. 2B). Then, if the user selects any one application (see (25) of FIG. 2B), the OS 14a returns an intent including the identification information of the selected application, and the type and the action used as the search criteria (see (26) of FIG. 2B). If receiving the intent from the OS 14a, the sharing source application 60 calls the API of the OS 14a, designates the identification information of the selected application included in the intent, the URI and type of the shared data, and the action, and makes a request to OS 14a to perform the sharing function (see (27) of FIG. 2B). The OS 14a activates the application (the sharing destination application 64) designated from the sharing source application 60, sets the screen of the sharing destination application 64, and notifies the sharing destination application 64 of the URI and type of the shared data and the action notified from the sharing source application 60 (see (28) of FIG. 2B).

That is, a sharing function which enables the sharing source application 60 to notify the OS 14a of the URI of the shared data and so on without recognizing the sharing destination application 64 is called the implicit sharing function, and a sharing function which enables the sharing source application 60 to designate the sharing destination application 64 and notify the OS 14a of the URI of the shared data and so on is called the explicit sharing function. The present application 14b will be described on the assumption that the present application 14b uses the explicit sharing function of the OS 14a.

FIGS. 5 through 7 are flow charts showing a main thread process that the CPU 11 of the portable terminal 10 executes in accordance with the present application 14b. This process is started in a case where through an operation acceptance screen (not shown) of the present application 14b, the user has given an instruction to execute a scan. It should be noted that each of the steps shown in the flow charts of FIGS. 5 through 8 described below is described as a step that the present application 14b causes the CPU 11 to execute or that the present application 14b utilizes a function of the OS 14a or the like to cause the CPU 11 to execute. However, the steps included in the flow charts may be partially replaced by a step(s) that the OS 14a or another application causes the CPU 11 to execute. Further, the steps included in the flow charts may be partially replaced by a step(s) that is implemented by running hardware per se provided in the portable terminal 10 without involvement of the CPU 11.

Figure 3:
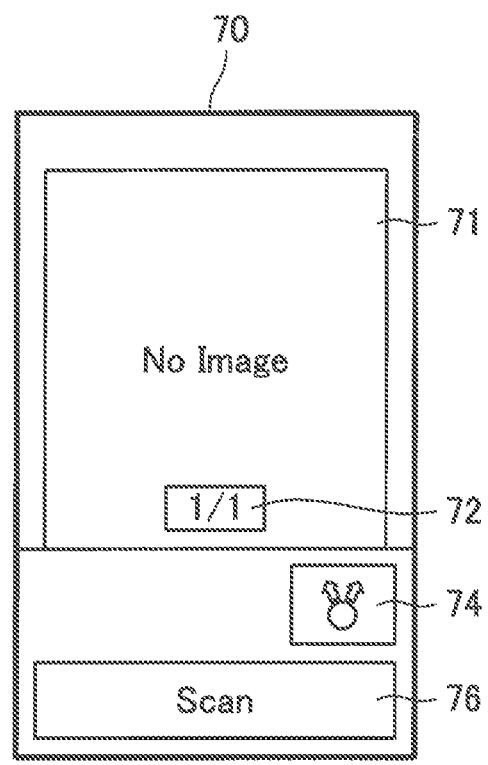
FIG. 3 is a view illustrating a screen example of a scan screen.

In step S105, the CPU 11 causes the LCD 18 to display a scan screen 70. FIG. 3 illustrates a screen example of the scan screen 70. The scan screen 70 includes a scan image 71, a page display area 72, a share button 74, and a scan button 76. The scan image 71 is an image that corresponds to the scan data. Before the execution of a scan process, the scan image 71 displayed may be one (for example, a character string such as "No Image") that shows that no scan data has been created yet.

The page display area 72 is an area in which to display the total number of pages of a document that has been read by the device 30 and the page number of that one of the pages which is currently displayed as the scan image 71. The share button 74 is an area in which to input an instruction to execute the sharing function.

The scan button 76 is an area in which to input an instruction to execute the scan process. When the user touches the scan button 76, information that instructs the device 30 to execute the scan process is transmitted to the device 30 through the wireless LAN transceiver 15.

In step S110, the CPU 11 determines whether or not input of a sharing execution instruction has been accepted. This determination may be made depending on whether or not the share button 74 of the scan screen 70 has been touched. If the determination is positive (S110: YES), the CPU 11 proceeds to step S115.

Figure 4A:
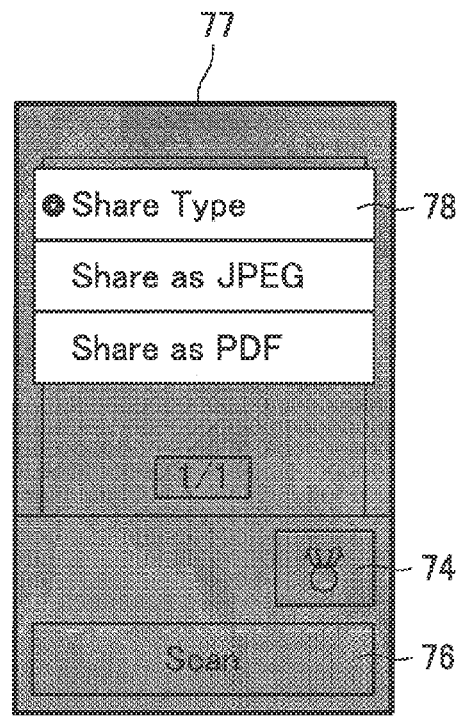
FIG. 4A is a view illustrating a screen example of a format selection screen.

In step S115, the CPU 11 causes the LCD 18 to display a format selection screen 77. FIG. 4A illustrates a screen example of the format selection screen 77. The format selection screen 77 includes a format selection area 78. The formal selection area 78 is an area in which to accept selection of either the PDF format or the JPEG format. The user performs a selection operation of selecting in which format he/she would like another application to share the scan data, by touching a choice of the selected format. In the format selection screen 77, the share button 74 and/or the scan button 76 may be grayed out to be in such a state as to be not capable of accepting a user operation.

In step S120, the CPU 11 determines whether or not the format of the shared data has been selected. This determination may be made depending on whether or not the format selection area 78 has been touched. If the CPU 11 determines that the JPEG format has been selected (S120: JPEG), the CPU 11 proceeds to step S130.

In step S130, the CPU 11 determines whether or not there exists a multiple-JPEG supporting application, which is an application that is capable of processing a plurality of JPEG data. Specifically, the CPU 11 makes a request to the OS 14a to search for an application that complies with the action "SEND_MULTI" and that is capable of processing data in the JPEG format. It should be noted that the action "SEND_MULTI" is an action that only a multiple-JPEG supporting application declares. In a case where the OS 14a returns information including identification information of a multiple-JPEG supporting application, the CPU 11 determines that there exists a multiple-JPEG supporting application, and in a case where the OS 14a does not return information including identification information of a multiple-JPEG supporting application, the CPU 11 determines that there does not exist a batch-processing application. An example of information including identification information of an application is an application name included in an intent in an Android (registered trademark of Google Inc.) OS. If no multiple-JPEG supporting application has been found (S130: NO), the CPU 11 proceeds to step S135.

In step S135, the CPU 11 causes the LCD 18 to display a warning about a scan of a plurality of pages. The warning may be a character string such as "in case of scanning a plurality of pages, not all of the plurality of pages may be shared". Further, the CPU 11 causes the LCD 18 to display an OK button and a cancel button (both not shown). In step S137, the CPU 11 determines whether or not a user input has been accepted. If the CPU 11 determines that the cancel button has been touched (S137: Cancel), the CPU 11 returns to step S110, and if the CPU 11 determines that the OK button has been touched (S137: OK), the CPU 11 proceeds to step S140.

Figure 4B:
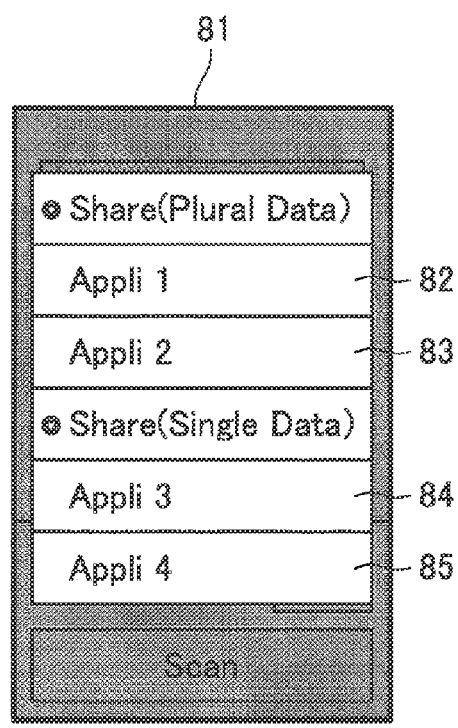
FIG. 4B is a view illustrating a screen example of a sharing-destination application list screen.
Figure 8:
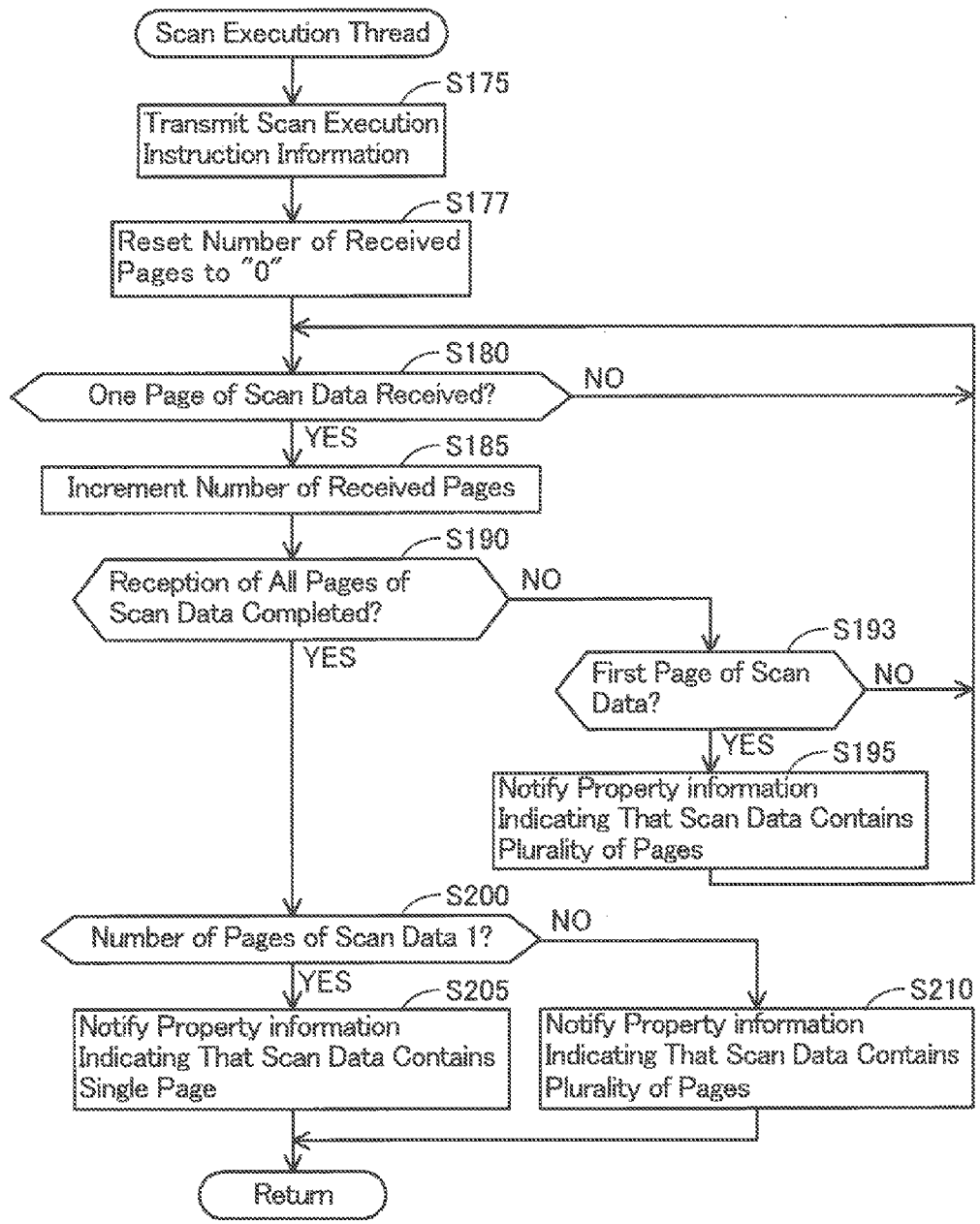
FIG. 8 is a flow chart showing a scan execution thread process.

In step S140, the CPU 11 causes the LCD 18 to display a sharing-destination application list screen 81. FIG. 4B illustrates a screen example of the sharing-destination application list screen 81. The sharing-destination application list screen 81 is a screen that shows a list of applications that can be selected as a data output destination by the sharing function. The sharing-destination application list screen 81 displays the names 82 to 85 of applications. The names 82 and 83 are the names of multiple-JPEG supporting applications. The names 84 and 85 are the names of single-JPEG supporting applications. A single-JPEG supporting application is an application that is capable of processing only one page of data.

A specific example of the process in step S140 is described. The present application 14b calls the API of the OS 14a, designates the type of a processing object format and an action, and makes a request to the OS 14a to display a list of candidates for the sharing destination application 64. At this point in time, the present application 14b makes a request to the OS 14a to search for applications that are capable of processing data in the JPEG format and that comply with the action "SEND_MULTI" or "SEND", and to display a list of the applications on the sharing-destination application list screen 81. That is, the present application 14b executes the process shown in (21) of FIG. 2B. It should be noted here that the action "SEND_MULTI" is an action that is designated in a case where the scan data is plural pages of JPEG data. The action "SEND" is an action that is designated in a case where the scan data is a single page of JPEG data. Meanwhile, in receiving the request to display a list, the OS 14a searches for candidates for the sharing destination application 64 (FIG. 2) and causes the LCD 18 to display the sharing-destination application list screen 81 listing the names 82 to 85 of the applications thus found. This allows the user to select, from the sharing-destination application list screen 81, an application that is capable of processing JPEG data.

In step S143, the CPU 11 determines whether or not the sharing destination application 64 has been selected. Specifically, in receiving, from the OS 14a, an intent including identification information of the sharing destination application 64 selected on the sharing-destination application list screen 81, the CPU 11 determines that the sharing destination application 64 has been selected. If the determination is negative (S143: NO), the CPU 11 returns to step S143, and if the determination is positive (S143: YES), the CPU proceeds to step S145.

In step S145, the CPU 11 determines whether or not the sharing destination application 64 thus selected is a multiple-JPEG supporting application. If the determination is positive (S145: YES), the CPU 11 proceeds to step S150. In step S150, the CPU 11 stores, in the flash memory 14, sharing-destination application identification information indicating that a multiple-JPEG supporting application has been selected as the sharing destination application 64. Then, the CPU 11 returns to step S110. The sharing-destination application identification information may for example be ID information for identifying the application kind of the sharing destination application 64. On the other hand, if the determination in step S145 is negative (S145: NO), the CPU 11 proceeds to step S155. In step S155, the CPU 11 stores, in the flash memory 14, sharing-destination application identification information indicating that a single-JPEG supporting application has been selected as the sharing destination application 64. Then, the CPU 11 returns to step S110.

Meanwhile, if the CPU 11 determines in step S120 that the PDF format has been selected (S120: PDF), the CPU 11 proceeds to step S125.

In step S125, the CPU 11 causes a list of the names of PDF-supporting applications to be displayed on the sharing-destination application list screen 81. A PDF-supporting application is an application that is capable of processing plural pages of data. This allows the user to select, from the sharing-destination application list screen 81, an application that is capable of processing PDF data. It should be noted that the content of the process in step S125 is the same as the content of the process in step S140 mentioned above, and as such, is not described here.

In step S127, the CPU 11 determines whether or not the sharing destination application 64 has been selected. If the determination is negative (S127: NO), the CPU 11 returns to step S127, and if the determination is positive (S127: YES), the CPU 11 proceeds to step S129. In step S129, the CPU 11 stores, in the flash memory 14, sharing-destination application identification information indicating that a PDF-supporting application has been selected as the sharing destination application 64. Then, the CPU 11 returns to step S110.

Further, if the determination in step S110 is negative (S110: NO), the CPU 11 proceeds to step S170. In step S170, the CPU 11 determines whether or not input of a scan execution instruction has been accepted. This determination may be made depending on whether or not the scan button 76 of the scan screen 70 has been touched. If the determination is positive (S170: YES), the CPU 11 proceeds to step S173.

In step S173, the CPU 11 activates a scan execution thread. The scan execution thread is a thread that is processed in parallel with a main thread. The content of the process of the scan execution thread is described with reference to FIG. 8.

In step S175, the CPU 11 transmits scan execution instruction information to the device 30 through the wireless LAN transceiver 15. Upon receiving the scan execution instruction information, the device 30 scans the document to generate scan data, and transmits the scan data to the portable terminal 10. The scan data may be uncompressed or losslessly-compressed RAW image data or image data lossy compressed by the JPEG format or the like. In a case where the document contains a plurality of pages, the device 30 executes the scan process on one page after another to generate on scan data for each page. Every time the device 30 generates one scan data, the device 30 transmits the one scan data thus generated to the portable terminal 10 through the access point 50. Then, according to detecting completion of the scan process on all of the pages of the document, the device 30 transmits job completion information to the portable terminal 10. In a case where the device 30 includes an ADF (referred to as Auto Document Feeder), the plural pages of the document may be automatically read. Then, according to detection of scanning of all of the pages of the document placed on the ADF, the job completion information may be transmitted to the portable terminal 10. Meanwhile, in a case where the device 30 does not include an ADF, the user may execute a scan by placing one page after another of the document on the flat bed. Then, in accepting input of a scan termination instruction, the device 30 may transmit job completion information to the portable terminal 10. The scan termination instruction may for example be inputted by a scan termination button being touched by the user.

In step S177, the CPU 11 resets the number of received pages as stored in the RAM 13 to "0". In step S180, the CPU 11 determines whether or not one page of scan data has been received from the device 30. If the determination is negative (S180: NO), the CPU 11 returns to step S180, and if the determination is positive (S180: YES), the CPU 11 proceeds to step S185. In step S185, the CPU 11 increments the number of received pages as stored in the RAM 13.

In step S190, the CPU 11 determines whether or not reception of all of the pages of scan data has been completed. This determination is made by determining whether or not job completion information has been received from the device 30.

For example, in a case where no job completion information has been received within a predetermined period of time since the completion of reception of one page of scan data was detected in step S180, the CPU 11 may determine that no job completion information has been received. If the determination is negative (S190: NO), the CPU 11 proceeds to step S193.

In step S193, the CPU 11 determines whether or not the scan data received this time in step S180 is the first page of scan data. This determination may be made on the basis of the aforementioned number of received pages. If the determination is negative (S193: NO), the CPU 11 returns to step S180, in which the CPU 11 receives the next page of scan data. On the other hand, if the determination is positive (S193: YES), the CPU 11 proceeds to step S195.

In step S195, the CPU 11 predicts that the second (and subsequent) page(s) of scan data will be transmitted later, since no job completion information has been received after the reception of the first page of scan data. In other words, the CPU 11 predicts that the scan data to be received contains a plurality of pages. Accordingly, the CPU 11 notifies, to the main thread, property information indicating that the scan data to be received contains a plurality of pages. The property information is information concerning the execution property of the scan process that is performed by the device 30. Then, the CPU 11 returns to step S180, in which the CPU 11 receives the next page of scan data.

On the other hand, if the determination in step S190 is positive (S190: YES), the CPU 11 proceeds to step S200. In step S200, the CPU 11 determines whether or not the number of pages of scan data received from the device 30 is one. This determination may be made on the basis of the aforementioned number of received pages. If the determination is positive (S200: YES), the CPU 11 proceeds to step S205. In step S205, the CPU 11 notifies, to the main thread, property information indicating that a single page of scan data has been received according to completion of the scan process. On the other hand, if the determination is negative (S200: NO), the CPU 11 proceeds to step S210. In step S210, the CPU 11 notifies, to the main thread, property information indicating that plural pages of scan data have been received according to completion of the scan process. Then, the CPU 11 terminates the scan execution thread.

In step S240 of FIG. 6, the CPU 11 determines whether or not the sharing destination application 64 has already been selected. This determination may be made in step S129, S150, or S155 depending on whether or not the sharing-destination application identification information is stored in the flash memory 14. If the determination is positive (S240: YES), the CPU 11 proceeds to step S245.

In step S245, the CPU 11 determines, on the basis of the sharing-destination application identification information, whether or not a multiple-JPEG supporting application has been selected as the sharing destination application 64. If the determination is positive (S245: YES), the CPU 11 proceeds to step S265, and if the determination is negative (S245: NO), the CPU 11 proceeds to step S250.

In step S250, the CPU 11 determines whether or not the scan data received from the device 30 contains a plurality of pages. This determination may be made on the basis of the property information of which the main thread was notified in step S195, S205, or S210. If the determination is negative (S250: NO), the CPU 11 proceeds to step S265. On the other hand, if the determination is positive (S250: YES), the CPU 11 proceeds to step S255.

In step S255, the CPU 11 causes the LCD 18 to display a warning error indicating that the single-JPEG supporting application selected by the user does not support plural pages of scan data. Further, the CPU 11 causes the LCD 18 to display the sharing-destination application list screen 81 to accept re-selection of the sharing destination application 64. At this point in time, the CPU 11 may cause the LCD 18 to display only the names 82 and 83 of multiple-JPEG supporting applications.

In step S260, the CPU 11 determines whether or not the sharing destination application 64 has been re-selected. The specific content of the process in step S260 is the same as the content of the process in step S143 mentioned above, and as such, is not described here. If the determination is negative (S260: NO), the CPU 11 returns to step S260, and if the determination is positive (S260: YES), the CPU 11 proceeds to step S265.

In step S265, the CPU 11 executes a sharing process of causing the sharing destination application 64 to share the scan data. Specifically, the CPU 11 calls the API of the OS 14a. The CPU 11 designates identification information of the sharing destination application 64, the URI of shared data that is one or more scan data, the type of "JPEG" or "PDF", and the action "SEND_MULTI" or "SEND". The CPU 11 makes a request to the OS 14a to execute the explicit sharing function. In a case where a multiple-JPEG supporting application has been selected as the sharing destination application 64, the CPU 11 creates a plurality of JPEG data by creating a single item of JPEG data from each of the plurality of scan data. Alternatively, in a case where a single-JPEG supporting application has been selected as the sharing destination application 64, the CPU 11 creates a single item of JPEG data from the single item of scan data. Alternatively, in a case where a PDF-supporting application has been selected as the sharing destination application 64, the CPU 11 creates a single item of PDF data containing a single page or a plurality of pages from the one or more scan data.

In step S267, the CPU 11 causes the LCD 18 to display information indicating that the process of causing the sharing destination application 64 to share all of the items of scan data has been completed. At this point in time, the CPU 11 may cause the LCD 18 to display a thumbnail image represented by the last item of scan data that the CPU 11 caused the sharing destination application 64 to share. In step S270, the CPU 11 erases the sharing-destination application identification information from the flash memory 14. Then, the CPU 11 terminates the flow.

Alternatively, if the determination in step S240 is negative (S240: NO), the CPU 11 proceeds to step S280. In step S280, the CPU 11 causes the LCD 18 to display the format selection screen 77. The content of the process in step S280 is the same as the content of the process in step S115 mentioned above, and as such, is not described here.

In step S285, the CPU 11 determines whether or not the format of the shared data has been selected. If the CPU 11 determines that the JPEG format has been selected (S285: JPEG), the CPU 11 proceeds to step S295.

In step S295, the CPU 11 determines whether or not the scan data received from the device 30 contains a plurality of pages. If the determination is positive (S295: YES), the CPU 11 proceeds to step S300, in which the CPU 11 causes the LCD 18 to display only the names 82 and 83 of multiple-JPEG supporting applications. On the other hand, if the determination is negative (S295: NO), the CPU 11 proceeds to step S305, in which the CPU 11 causes the LCD 18 to display the names 82 and 83 of multiple-JPEG supporting applications and the names 84 and 85 of single-JPEG supporting applications. The content of the process in step S295 is the same as the content of the process in step S140 mentioned above, and as such, is not described here.

Alternatively, if the CPU 11 determines in step S285 that the PDF format has been selected (S285: PDF), the CPU 11 proceeds to step S290. In step S290, the CPU 11 causes a list of the names of PDF-supporting application to be displayed on the sharing-destination application list screen 81. Then, the CPU 11 proceeds to step S310.

In step S310, the CPU 11 determines whether or not the sharing destination application 64 has been selected. If the determination is negative (S310: NO), the CPU 11 returns to step S310, and if the determination is positive (S310: YES), the CPU 11 proceeds to step S335. The contents of the processes in steps S335, S337, and S340 are the same as the contents of the processes in steps S265, S267, and S270 mentioned above, respectively, and as such, are not described here.

<Effects>

By activating the scan execution thread (S170: YES, S173), the device control application 14b described in this specification can cause the device 30 to generate scan data (S175), and acquire, from the device 30, the scan data thus generated (S180). Moreover, before acquiring all of the plural pages of scan data from the device 30 (S190: NO), the device control application 14b described in this specification can predict whether or not the scan data to be generated contains a plurality of pages, and in a case where it is predicated that the scan data to be generated contains a plurality of pages, can notify the main thread of property information indicating that the scan data to be received contains a plurality of pages (S195). Moreover, in a case where the acquired property information indicates execution property that the scan data contains a plurality of pages (S295: YES) in accepting selection of the sharing destination application 64 (S240: NO), the device control application 14b described in this specification can cause the LCD 18 to display multiple-JPEG supporting applications as candidates for the sharing destination application 64 (S300). Alternatively, in a case where the acquired property information indicates such execution property that the scan data contains a single page (S295: NO), the device control application 14b described in this specification can cause the LCD 18 to display single-JPEG supporting applications as candidates for the sharing destination application 64 (S305). Moreover, in accepting the selection of the sharing destination application 64 (S310: YES), the device control application 14b described in this specification can execute the sharing process of causing the sharing destination application 64 to share the scan data (S335). All this makes it possible to, before completion of the scan process on all of the pages of the document, predict whether the scan data contains a plurality of pages or a single page and cause the user to select the sharing destination application 64 in compliance with a result of the prediction. This makes it possible to prevent an application that does not support the execution property of the scan process from being selected as the sharing destination application 64, thus making it possible to surely cause the sharing destination application 64 to process the scan data. Further, since it is not necessary to keep the user wait for completion of the scan process on all of the pages of the document, it becomes possible to enhance the convenience of the user.

The device control application 14b described in this specification makes it possible to, in accepting input of a sharing execution instruction (S110: YES), cause the LCD 18 to display the sharing-destination application list screen 81 (S140). Further, the device control application 14b described in this specification can accept input of a selection operation of selecting the sharing destination application 64 (S143). The device control application 14b described in this specification can accept input of a scan execution instruction after accepting the input of the operation of selecting the sharing destination application 64 (S170: YES). Moreover, before acquiring all of the plural pages of scan data from the device 30 (S190: NO), the device control application 14b described in this specification can predict whether or not the scan data to be generated by the device 30 contains a plurality of pages, and in a case where it is predicated that the scan data to be generated contains a plurality of pages, can notify the main thread of property information indicating such execution property that the scan data to be received contains a plurality of pages (S195). In a case where the sharing destination application 64 selected is a single-JPEG supporting application (S245: NO), and the property information indicates such execution property that the scan data contains a plurality of pages (S250: YES), the device control application 14b described in this specification can determine that the sharing destination application 64 does not support the execution property of the scan process. This makes it possible to cause the LCD 18 to display only the names of multiple-JPEG supporting applications (S255) and accept input of re-selection of the sharing destination application 64 (S260). In accepting the re-selection of the sharing destination application 64 (S260: YES), the device control application 14b described in this specification can execute the sharing process of causing the sharing destination application 64 to share the scan data (S265). All this makes it possible to, before accepting input of the scan execution instruction (S170), execute acceptance of selection of the sharing destination application 64 (S147, S127). Moreover, before completion of the scan process on all of the pages of the document, the device control application 14b described in this specification can predict whether or not the sharing destination application 64 selected supports the execution property of the scan process (S250). Moreover, in a case where it is predicted that the sharing destination application 64 does not support the execution property of the scan process (S245: NO, S250: YES), the device control application 14b described in this specification can cause the user to re-select a sharing destination application 64 that supports the execution property (S260). This makes it possible to prevent an application that does not support the execution property of the scan process from being selected as the sharing destination application 64, thus making it possible to surely cause the sharing destination application 64 to process the scan data. Further, since it is not necessary to keep the user wait for completion of the scan process on all of the pages of the document, it becomes possible to enhance the convenience of the user.

According to the device control application 14b described in this specification, in a case where scan data generated on the basis of the first page of the document is acquired from the device 30 (S180: YES), and thereafter job completion information is acquired from the device 30 (S190: YES) without the acquisition of scan data generated on the basis of the second (and subsequent) page(s) of the document (S200: YES), the device control application 14b can determine that property information indicating such execution property that the scan data containing only one page has been acquired, and can notify the main thread of the property information accordingly (S205). This makes it possible to surely cause the sharing destination application 64 to process the scan data, thus making it possible to enhance the convenience.

Although the aspect of the present disclosure has been described based on the embodiments, it is easily inferable that the present invention is not limited to the above-mentioned embodiments, but may be variously modified for improvement without departing from the scope of the invention.

<Modification 1>

Figure 9:
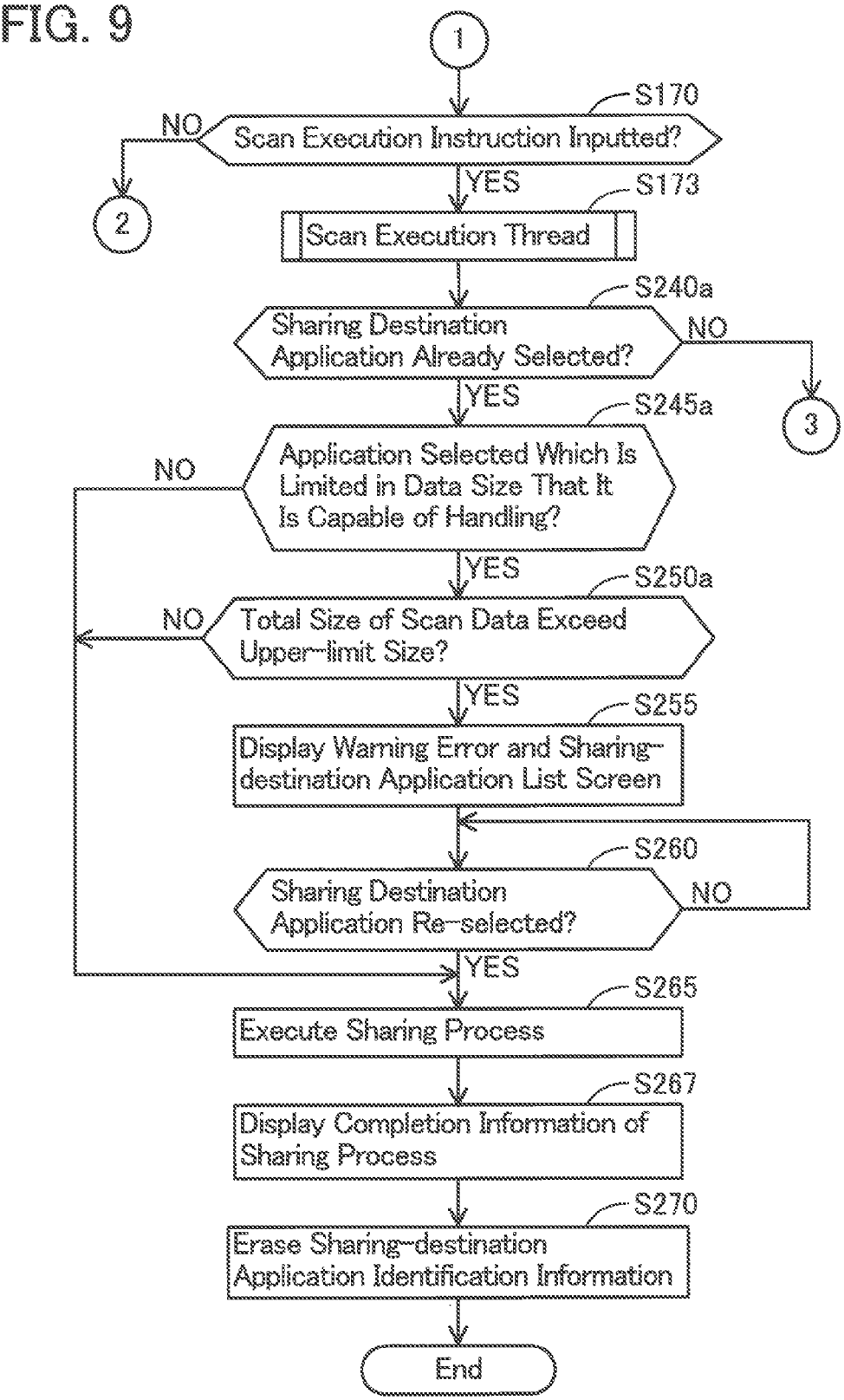
FIG. 9 is a flow chart showing a modification of a main thread process.
Figure 10:
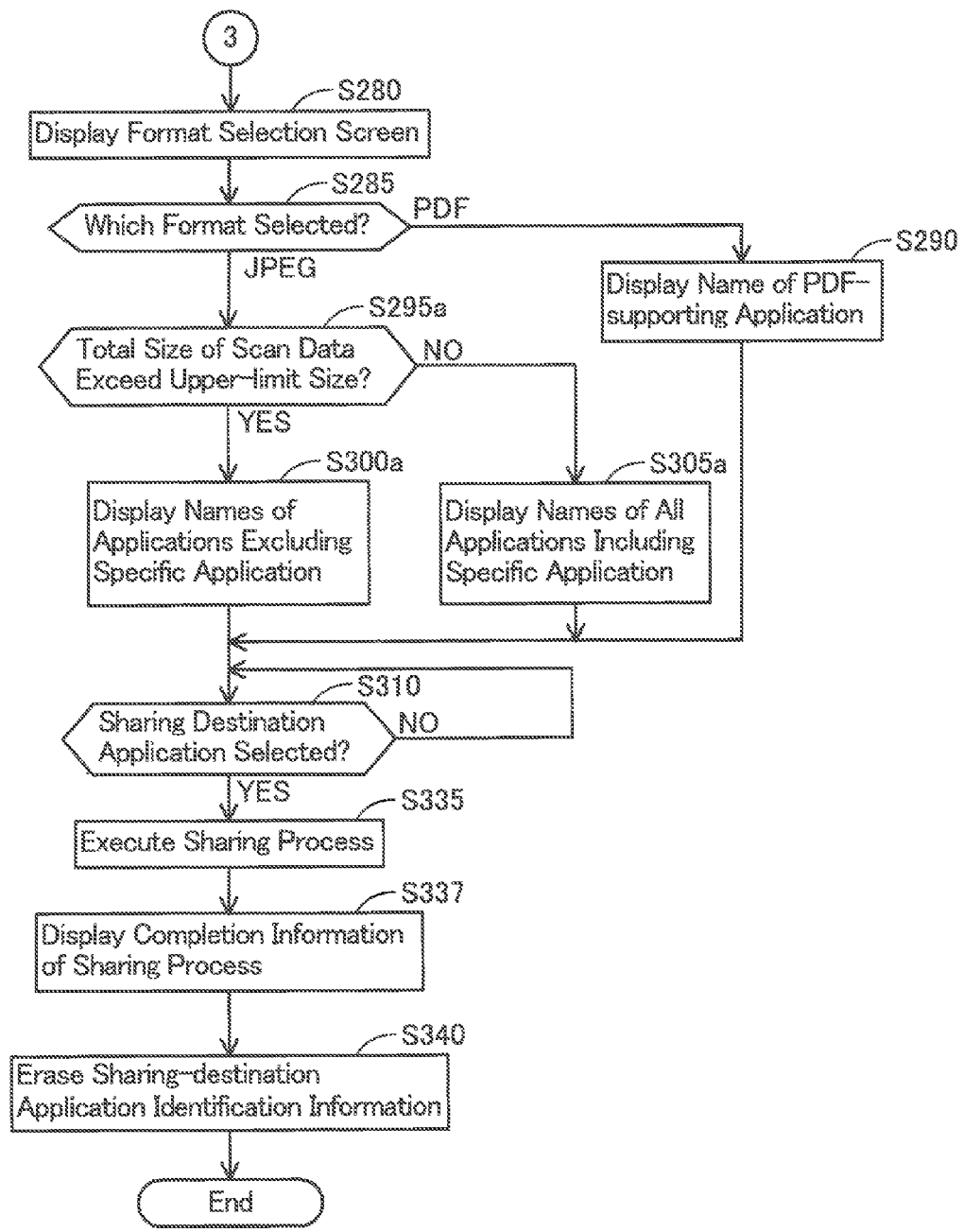
FIG. 10 is a flow chart showing the modification of the main thread process.
Figure 11:
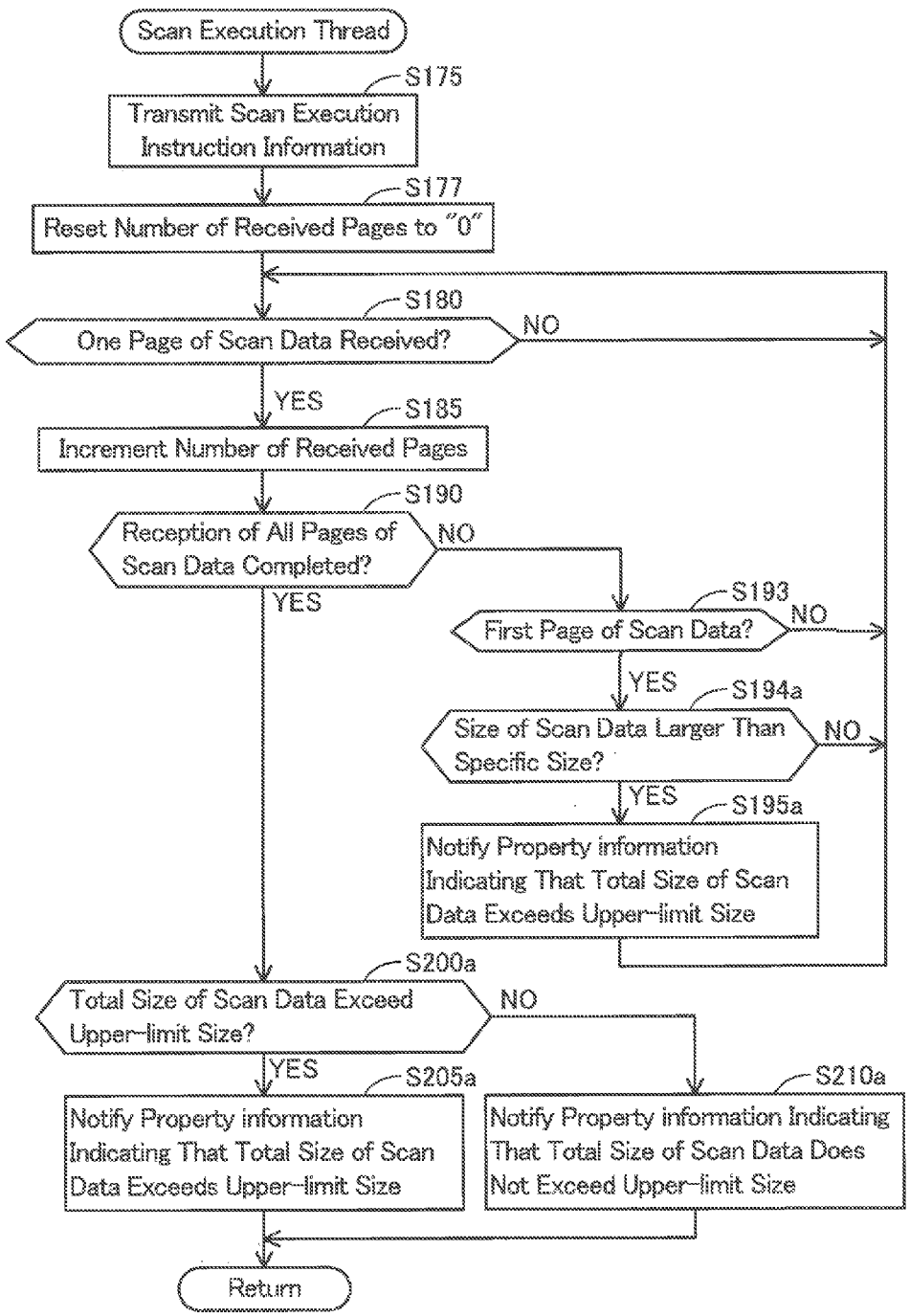
FIG. 11 is a flow chart showing a modification of a scan execution thread process.

As the execution property of a scan process, the total size of a single item or a plurality of scan data generated by the scan process may be used. A specific example is described with reference to the flow charts of FIGS. 9 through 11. The flow charts of FIGS. 9 through 11 are flow charts prepared by making partial modifications to the flow charts of FIGS. 6 through 8, respectively. The contents of those steps in the flow charts of FIGS. 9 through 11 which are given the same reference signs as those in the flow charts of FIGS. 6 through 8 have been described, and as such, are not described here. If the CPU 11 determines, in step S193 of FIG. 11, that the first page of scan data has been received (S193: YES), the CPU 11 proceeds to step S194a. In step S194a, the CPU 11 determines whether or not the size of the first page of scan data is larger than a predetermined specific size. When the sharing destination application 64 has not been selected, the specific size may be appropriately determined on the basis of a data size that can be handled by a candidate application for the sharing destination application 64. Alternatively, when the sharing destination application 64 has been selected, the specific size may be appropriately determined on the basis of a data size that can be handled by the sharing destination application 64. For example, in a case where the sharing destination application 64 has not been selected, an application that is smallest in data size that it is capable of handling is set as a specific application, and a specific size may be acquired which is based on the data size that can be handled by the specific application. Alternatively, in a case where the sharing destination application 64 has been selected, the selected application is set as a specific application, and a specific size may be acquired which is based on the data size that can be handled by the specific application. In a case where the data size that can be handled by the specific application is 2 MB, the specific size may be 1 MB, which is a half of the data size that can be handled by the specific application. Alternatively, in a case where the data size that can be handled by the specific application is 5 MB, the specific size may be 2 MB. Alternatively, in a case where there is no limit on the data size that can be handled by the specific application, the specific size may be limitless, or the process may be performed in such a manner as not to determine, in steps S194a and S200a, whether or not the size of the scan data exceeds the specific size. It should be noted that in a case where the size of the scan data exceeds the specific size at a point in time where some of the pages of scan data have been acquired, it is highly likely that the size of all of the pages of scan data exceeds the data size that can be handled. That is, determining whether or not the size of the scan data exceeds the specific size at a point in time where some of the pages of scan data have been acquired is also determining whether or not it is highly likely that the size of all of the pages of scan data exceeds the data size that can be handled. An example of the specific application is an e-mail application, and an example of data that is handled by the specific application is an attached file.

It is also possible to declare in advance for each application the data size that can be handled by that application. In this case, the CPU 11 may acquire, through the OS 14a, the data sizes that can be handled by the respective applications. Alternatively, the CPU 11 may acquire, from the flash memory 14 or the Internet, the data sizes that can be handled by the respective applications.

If the determination in S194a is negative (S194a: NO), the CPU 11 returns to step S180, and if the determination is positive (S194a: YES), the CPU 11 proceeds to step S195a. In step S195a, the CPU 11 predicts that the scan data to be received contains a plurality of pages and the total size of the plural pages of scan data is larger than an upper-limit size. Accordingly, the CPU 11 notifies the main thread of property information indicating that the total size of the scan data exceeds the upper-limit size. Further, in step S200a, the CPU 11 determines whether or not the total size of the scan data received from the device 30 exceeds the upper-limit size. If the determination is positive (S200a: YES), the CPU 11 proceeds to step S205a, in which the CPU 11 notifies the main thread of property information indication that the total size of the scan data exceeds the upper-limit size. Then, the CPU 11 proceeds to step S240a of FIG. 9. On the other hand, if the determination is negative (S200a: NO), the CPU 11 proceeds to step S210a, in which the CPU 11 notifies the main thread of property information indicating that the total size of the scan data does not exceed the upper-limit size. Then, the CPU 11 proceeds to step S240a of FIG. 9.

If the CPU 11 determines, in step S240a, that the sharing destination application 64 has already been selected (S240a: YES), the CPU 11 proceeds to step S245a. In step S245a, the CPU 11 determines whether or not an application limited in data size that it is capable of handling has been selected as the sharing destination application 64. If the determination in step S245a is positive (S245a: YES), the CPU 11 proceeds to step S250a. In step S250a, the CPU 11 determines whether or not the total size of the scan data received from the device 30 exceeds the upper-limit size. This determination may be made on the basis of the property information of which the main thread was notified in step S195a, S205a, or S210a of FIG. 11. If the determination is positive (S250a: YES), the CPU 11 proceeds to step S255, in which the CPU 11 causes the LCD 18 to display a warning error indicating that the specific application selected by the user is incapable of handling plural pages of scan data.

Further, in step S295a of FIG. 10, the CPU 11 determines whether or not the total size of the scan data received from the device 30 exceeds the upper-limit size. If the determination is positive (S295a: YES), the CPU 11 proceeds to step S300a, in which the CPU 11 causes the LCD 18 to display the names of applications excluding the specific application. On the other hand, if the determination is negative (S295a: NO), the CPU 11 proceeds to step S305a, in which the CPU 11 causes the LCD 18 to display the names of all of the applications including the specific application.

All this makes it possible to predict, before completion of the scan process on all of the pages of the document, whether or not the total size of the scan data exceeds the upper-limit size and cause the user to select the sharing destination application 64 in compliance with a result of the prediction. This makes it possible to surely cause the sharing destination application 64 to process the scan data. Further, since it is not necessary to keep the user wait for completion of the scan process on all of the pages of the document, it becomes possible to enhance the convenience of the user.

<Modification 2>

Figure 12:
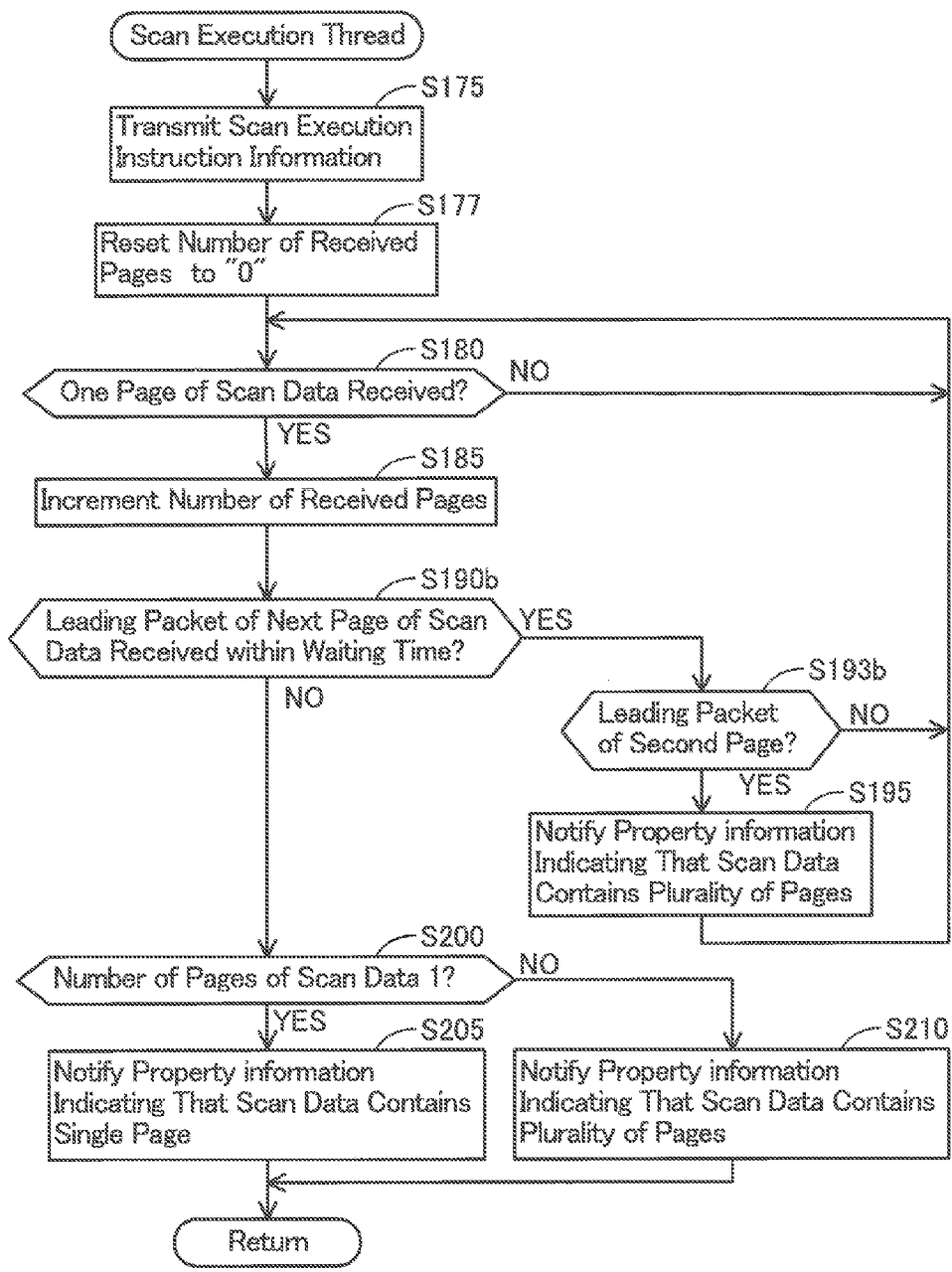
FIG. 12 is a flow chart showing the modification of the scan execution thread process.

In step S190, there may be various modes of determining whether or not reception of all of the pages of scan data has been completed. For example, there may be a mode in which no job completion information is used. A specific example is described with reference to the flow chart of FIG. 12. The contents of those steps in the flow charts of FIG. 12 which are given the same reference signs as those in the flow charts of FIG. 8 have been described, and as such, are not described here. In step S190b, the CPU 11 determines whether or not the leading packet of the next page of scan data has been received within a predetermined waiting time. If the determination is negative (S190b: NO), the CPU 11 determines that reception of all of the pages of scan data has been completed, and proceeds to step S200. On the other hand, if the determination is positive (S190b: YES), the CPU 11 determines that reception of all of the pages of scan data has not been completed, and proceeds to step S193b.

In step S193b, the CPU 11 determines whether or not the leading packet thus received is the leading packet of the second page of scan data. This determination may be made on the basis of the number of received pages. If the determination is negative (S193b: NO), the CPU 11 returns to steps S180, and if the determination is positive (S193b, YES), the CPU 11 proceeds to step S195. In step S195, since the leading packet of the second page of scan data has been received, the CPU 11 predicts that the scan data to be received contains a plurality of pages. Then, the CPU 11 notifies the main thread of property information indicating that the scan data to be received contains a plurality of pages.

All this makes it possible to divert the leading packet of the second page of scan data as property information indicating such execution property that the scan data contains a plurality of pages. This makes it possible to, before completion of the scan process on all of the pages of the document, predict whether the scan data contains a single page or a plurality of pages and cause the user to select the sharing destination application 64 in compliance with a result of the prediction.

<Other Modifications>

There may be a mode in which selection of the sharing destination application 64 is accepted after input of the scan execution instruction has been accepted. In this case, it is only necessary to delete steps S110 through S155 of FIG. 5. It is only necessary to proceed from step S105 to step S170 of FIG. 6. If the determination in step S170 is negative, it is only necessary to return to step S170. It is only necessary to delete steps S240 through S270 of FIG. 6. It is only necessary to proceed from step S173 to step S280.

There may be a mode in which input of the scan execution instruction is accepted after selection of the sharing destination application 64 has been accepted. In this case, if the determination in step S110 is negative, it is only necessary to return to step S110. It is only necessary to proceed from each of steps S129, S150, and S155 to step S170 of FIG. 6. If the determination in step S170 is negative, it is only necessary to return to step S170. It is only necessary to delete steps S280 through S340 of FIG. 7. It is only necessary to delete step S240 and proceed from step S173 to step S245.

It is possible to omit to accept selection of the format of the shared data. In this case, it is only necessary to omit steps S115 through S129 of FIG. 5. If the determination in step S110 is positive, it is only necessary to proceed to step S130.

It is possible to omit the process of displaying a warning. In this case, it is possible to omit steps S130 through S137 and proceed from step S120 to S140.

According to the above, in general terms, in the first case, the device control application 14b simply needs to cause the CPU 11 to function at the least for "the sending", "the acquiring of the one or more image data", "the acquiring of property information", "the extracting", "the displaying", "the receiving", and "the processing". Specifically, the CPU 11 at least needs to execute S175, S195, S300, S305, and S335. Further, in the second case, the device control application 14b needs to cause the CPU 11 to function at the least for "the displaying of identification information", "the receiving of an input", "the sending", "the acquiring of the one or more image data", "the acquiring of property information", "the extracting", and "the processing". Specifically, the CPU 11 at least needs to execute S143, S175, S180, S195, S255, and S265.

In the above-mentioned embodiments, the JPEG format is an example of the multi-page supporting format, and the PDF format is an example of the multi-page supporting format; however, the multi-page non-supporting format and the multi-page supporting format are not limited thereto. For example, various kinds of format such as PNG, GIF, and BMP can be examples of the multi-page non-supporting format. Further, various kinds of format such as DOC and XLS can be examples of the multi-page supporting format.

For example, in the above-mentioned embodiments, the portable terminal 10 having a call function is an example of the information processing apparatus. However, examples of the information processing apparatus may include various apparatuses without a call function, such as a personal computer and a digital camera. Further, the present invention is applicable to apparatuses which include hard keys for manipulation input, without the touch panel 17.

In the above-mentioned embodiments, the JPEG data and the PDF data is stored in the memory card 20 installable and removable with respect to the portable terminal 10. However, those data may be stored in the flash memory 14 built in the portable terminal 10.

In the above-mentioned embodiments, the scan data has been described as an example of image data. However, the image data is not limited thereto but may be, for example, image data acquired by imaging of a digital camera built in the portable terminal 10. The digital camera may perform a serial imaging function to generate a plurality of image data in a single imaging operation. Also, data generated by reducing or enlarging the scan data in accordance with the size of the scan image 71 to be displayed on the LCD 18 may be an example of the image data.

In the above-mentioned embodiments, the generation is converting the image data acquired from the device 30 into a file having a selected format. In this case, the URI of the shared data is composed of a file path. However, the generation may be converting the image data acquired from the device 30 into contents having a process object format. In this case, the URI of the shared data may be configured in a format (contents format) that specifies the data by an index and ID of an application, like 'Contents:///devicecontrol1/attach/1'.

In the above-mentioned embodiments, a case where the OS 14a is an Android (registered as a trademark) OS has been described. However, the present invention is also applicable to an information processing apparatus having another OS installed therein.

In the above-mentioned embodiments, the sharing function is implemented by the OS 14a. However, the present invention is also applicable to a case where the sharing function is implemented by hardware or middleware.

In the above-mentioned embodiments, the portable terminal 10 and the device 30 make a Wi-Fi connection. However, the present invention is also applicable to a case where the portable terminal 10 and the device 30 are connected by Bluetooth (registered trademark of Bluetooth SIG).

In the above-mentioned embodiments, the names 82 to 85 of the applications included in the sharing-destination-application list screen 81 (FIG. 4B) correspond to examples of identification images for identifying the applications. However, the identification images of the applications may be icon images of the applications.

In the above-mentioned embodiments, the present application 14b can generate data in two kinds of formats. However, the present invention is also applicable to a program which can generate data in three or more formats.

Each of "the sending", "the acquiring of the one or more image data", "the acquiring of property information", "the extracting", "the displaying", "the receiving", and "the processing" may be configured solely by hardware, or by hardware that operates by executing programs other than those of the present invention, such as an operating system. Further, each of the aforementioned may be configured by hardware that operates by combining processes by a plurality of programs.

What is claimed is:

1. A non-transitory computer-readable recording medium which stores computer-readable instructions for an information processing device that is configured to have data, which is outputted by a first application that is a data output-source application, be processed by a second application, which is selected from among a plurality of applications as a data output-destination application, the information processing device comprising:
a processor;
a display; and
a communication interface for communicating with an image processing device configured capable of executing a scan process of scanning one or more documents and creating one or more image data,
the computer-readable instructions, when executed by the processor, causing the information processing device to perform:
sending execution instruction information that instructs an execution of the scan process to the image processing device through the communication interface;
acquiring the one or more image data from the image processing device through the communication interface;
acquiring property information indicating an execution property of the scan process before acquiring all of the one or more image data from the image processing device through the communication interface;
extracting one or more supporting applications from among the plurality of applications, the one or more supporting applications supporting the execution property indicated by the acquired property information;
displaying identification information for identifying the one or more supporting applications on the display;
receiving an input indicating a selection of the second application from among the one or more supporting applications of which identification information is displayed; and
processing the one or more image data by the second application that had been selected.

2. The non-transitory computer-readable recording medium according to claim 1, wherein
the execution property is a property related to whether one image data or plural image data are to be created in the scan process, and
in the extracting of the one or more supporting applications,
one or more applications capable of handling the plural image data are extracted as the supporting applications in a case where the execution property indicates the property that the plural image data are created, and
one or more applications capable of handling the single image data are extracted as the supporting applications in a case where the execution property indicates the property that the single image data is created.

3. The non-transitory computer-readable recording medium according to claim 2, wherein
the computer-readable instructions further causes the information processing device to perform:
determining that the property information that was acquired in the acquiring indicates the execution property that the one or more image data includes only one image data, in a case where first image data created from a first document is acquired from the image processing device through the communication interface, but second image data created from a second document is not acquired after having acquired the first image data.

4. The non-transitory computer-readable recording medium according to claim 2, wherein
the computer-readable instructions further causes the information processing device to perform:
determining that the property information that was acquired in the acquiring indicates the execution property that the one or more image data includes only one image data, in a case where first image data created from a first document is acquired from the image processing device through the communication interface, and information indicating that the scan process has completed is acquired from the image processing device through the communication interface without acquiring any image data created from second and subsequent documents.

5. The non-transitory computer-readable recording medium according to claim 2, wherein
the computer-readable instructions further causes the information processing device to perform:
determining that the property information that was acquired in the acquiring indicates the execution property that the one or more image data includes plural image data, in a case where first image data created from a first document is acquired from the image processing device through the communication interface, and second image data created from a second document is acquired from the image processing device through the communication interface after having acquired the first image data.

6. The non-transitory computer-readable recording medium according to claim 1, wherein
the execution property is a property related to whether a total size of the one or more image data created by the scan process is greater than a predetermined size or not, and
in the extracting of the one or more supporting applications,
one or more applications capable of handling the image data with a size greater than the predetermined size are extracted as the supporting applications in a case where the execution property indicates the property that the total size of the one or more image data is greater than the predetermined size, and
one or more applications capable of handling the image data with a size smaller than the predetermined size are extracted as the supporting applications in a case where the execution property indicates the property that the total size of the one or more image data is smaller than the predetermined size.

7. The non-transitory computer-readable recording medium according to claim 6, wherein
the computer-readable instructions further causes the information processing device to perform:
determining that the property information that was acquired in the acquiring indicates the execution property that the total size of the one or more image data is greater than the predetermined size, in a case where a size of first image data created from a first document by the image processing device is greater than half the predetermined size when the first image data is acquired from the image processing device through the communication interface, and information indicating that the scan process has completed is not acquired after having acquired the first image data.

8. A non-transitory computer-readable recording medium which stores computer-readable instructions for an information processing device that is configured to have data, which is outputted by a first application that is a data output-source application, be processed by a second application, which is selected from among a plurality of applications as a data output-destination application, the information processing device comprising:
a processor;
a display; and
a communication interface for communicating with an image processing device configured capable of executing a scan process of scanning one or more documents and creating one or more image data,
the computer-readable instructions, when executed by the processor, causing the information processing device to perform:
displaying identification information for identifying the plurality of applications on the display;
receiving an input indicating a first selection of the second application from among the plurality of applications of which identification information is displayed;
sending execution instruction information to the image processing device through the communication interface after having received the input indicating the first selection, wherein the execution instruction information instructs an execution of the scan process;
acquiring the one or more image data from the image processing device through the communication interface; and
acquiring property information indicating an execution property of the scan process before acquiring all of the one or more image data from the image processing device through the communication interface, and
in a case where the second application of the first selection does not support the execution property indicated by the acquired property information, the computer-readable instructions further causes the information processing device to perform:
extracting one or more supporting applications supporting the execution property indicated by the acquired property information;
displaying identification information for identifying the one or more supporting applications on the display;
receiving an input indicating a second selection that re-selects the second application from among the one or more supporting applications of which identification information is displayed; and
processing the one or more image data by the second application of the second selection.

9. The non-transitory computer-readable recording medium according to claim 8, wherein
the execution property is a property related to whether one image data or plural image data are to be created in the scan process, and
in the extracting of the one or more supporting applications,
one or more applications capable of handling the plural image data are extracted as the supporting applications in a case where the execution property indicates the property that the plural image data are created, and
one or more applications capable of handling the single image data are extracted as the supporting applications in a case where the execution property indicates the property that the single image data is created.

10. The non-transitory computer-readable recording medium according to claim 9, wherein
the computer-readable instructions further causes the information processing device to perform:
determining that the property information that was acquired in the acquiring indicates the execution property that the one or more image data includes only one image data, in a case where first image data created from a first document is acquired from the image processing device through the communication interface, but second image data created from a second document is not acquired after having acquired the first image data.

11. The non-transitory computer-readable recording medium according to claim 9, wherein
the computer-readable instructions further causes the information processing device to perform:
determining that the property information that was acquired in the acquiring indicates the execution property that the one or more image data includes only one image data, in a case where first image data created from a first document is acquired from the image processing device through the communication interface, and information indicating that the scan process has completed is acquired from the image processing device through the communication interface without acquiring any image data created from second and subsequent documents.

12. The non-transitory computer-readable recording medium according to claim 9, wherein
the computer-readable instructions further causes the information processing device to perform:
determining that the property information that was acquired in the acquiring indicates the execution property that the one or more image data includes plural image data, in a case where first image data created from a first document is acquired from the image processing device through the communication interface, and second image data created from a second document is acquired from the image processing device through the communication interface after having acquired the first image data.

13. The non-transitory computer-readable recording medium according to claim 8, wherein
the execution property is a property related to whether a total size of the one or more image data created by the scan process is greater than a predetermined size or not, and
in the extracting of the one or more supporting applications,
one or more applications capable of handling the image data with a size greater than the predetermined size are extracted as the supporting applications in a case where the execution property indicates the property that the total size of the one or more image data is greater than the predetermined size, and
one or more applications capable of handling the image data with a size smaller than the predetermined size are extracted as the supporting applications in a case where the execution property indicates the property that the total size of the one or more image data is smaller than the predetermined size.

14. The non-transitory computer-readable recording medium according to claim 13, wherein
the computer-readable instructions further causes the information processing device to perform:
determining that the property information that was acquired in the acquiring indicates the execution property that the total size of the one or more image data is greater than the predetermined size, in a case where a size of first image data created from a first document by the image processing device is greater than half the predetermined size when the first image data is acquired from the image processing device through the communication interface, and information indicating that the scan process has completed is not acquired after having acquired the first image data.

15. An information processing device that is configured to have data, which is outputted by a first application that is a data output-source application, be processed by a second application, which is selected from among a plurality of applications as a data output-destination application, the information processing device comprising:

a display;

a communication interface for communicating with an image processing device configured capable of executing a scan process of scanning one or more documents and creating one or more image data; and a control device configured to:

send execution instruction information that instructs an execution of the scan process to the image processing device through the communication interface;

acquire the one or more image data from the image processing device through the communication interface;

acquire property information indicating an execution property of the scan process before acquiring all of the one or more image data from the image processing device through the communication interface;

extract one or more supporting applications from among the plurality of applications, the one or more supporting applications supporting the execution property indicated by the acquired property information;

display identification information for identifying the one or more supporting applications on the display;

receive an input indicating a selection of the second application from among the one or more supporting applications of which identification information is displayed; and process the one or more image data by the second application that had been selected.

16. An information processing device that is configured to have data, which is outputted by a first application that is a data output-source application, be processed by a second application, which is selected from among a plurality of applications as a data output-destination application, the information processing device comprising:

a display;

a communication interface for communicating with an image processing device configured capable of executing a scan process of scanning one or more documents and creating one or more image data; and a control device configured to:

display identification information for identifying the plurality of applications on the display;

receive an input indicating a first selection of the second application from among the plurality of applications of which identification information is displayed;

send execution instruction information to the image processing device through the communication interface after having received the input indicating the first selection, wherein the execution instruction information instructs an execution of the scan process;

acquire the one or more image data from the image processing device through the communication interface; and acquire property information indicating an execution property of the scan process before acquiring all of the one or more image data from the image processing device through the communication interface, and in a case where the second application of the first selection does not support the execution property indicated by the acquired property information, the control device is further configured to:

extract one or more supporting applications supporting the execution property indicated by the acquired property information;

display identification information for identifying the one or more supporting applications on the display;

receive an input indicating a second selection that re-selects the second application from among the one or more supporting applications of which identification information is displayed; and process the one or more image data by the second application of the second selection.

* * * * *